(12) United States Patent
de Beus

(10) Patent No.: US 10,809,952 B1
(45) Date of Patent: Oct. 20, 2020

(54) SYSTEMS, PROCESSES, AND COMPUTER PROGRAM PRODUCTS FOR NETWORK PRINT REDIRECT TO PRINTING DEVICE ON DEVIATED ROUTE

(71) Applicant: KYOCERA Document Solutions Inc., Osaka (JP)

(72) Inventor: Eric de Beus, Redondo Beach, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 16/417,930

(22) Filed: May 21, 2019

(51) Int. Cl.
*G06F 3/12* (2006.01)

(52) U.S. Cl.
CPC .......... *G06F 3/1261* (2013.01); *G06F 3/1241* (2013.01); *G06F 3/1259* (2013.01); *G06F 3/1267* (2013.01)

(58) Field of Classification Search
CPC ...... G06F 3/126; G06F 3/1261; G06F 3/1241; G06F 3/1267; G06F 3/1259; G06F 3/1285; G06F 3/1292
See application file for complete search history.

(56) References Cited

U.S. PATENT DOCUMENTS

| | | | | |
|---|---|---|---|---|
| 2011/0002009 A1* | 1/2011 | Ohashi | ...................... | G01S 5/06 358/1.15 |
| 2011/0242565 A1* | 10/2011 | Armstrong | .............. | G06F 3/121 358/1.13 |
| 2012/0136634 A1 | 5/2012 | Yamade | | |
| 2017/0123737 A1* | 5/2017 | Januszewski | ........... | G06F 3/126 |

* cited by examiner

*Primary Examiner* — Kent Yip
(74) *Attorney, Agent, or Firm* — L/O of Alexis J Saenz

(57) ABSTRACT

A system and method provide redirection of print jobs from a first printer to a second printer. Aspects of the embodiments may automatically detect when a user is approaching a selected printer and if the print job is not finished, send the remainder of the print job to a second printer on the way to the user's destination. In some embodiments, the user may deviate from an intended route and the system may detect that another printer is more readily available to the user along the deviated route and may redirect the print job to the other printer. The user may pick up portions of the print job at one printer and without having to stop may continue on his or her route picking up other portions of the print job at other printers along the way.

19 Claims, 6 Drawing Sheets

SYSTEMS, PROCESSES, AND COMPUTER PROGRAM PRODUCTS FOR NETWORK PRINT REDIRECT TO PRINTING DEVICE ON DEVIATED ROUTE

CROSS-REFERENCE TO RELATED APPLICATION

None.

FIELD

The subject disclosure relates to networks and more particularly to systems, processes, and computer program products for network redirect of print jobs.

BACKGROUND

Network print jobs are often sent with the intention that the user will pick them up from the printer while travelling from a starting point to the printer. Commonly, a user makes a print request to a printer in the same building as the user. The printer is selected just prior the confirmation to print the document. The user must then go specifically to said printer.

In some cases, the user may be travelling from an office to a conference room, using a local network to issue the print job. Or the user may be travelling by vehicle, having used a remote computer to issue the print job and must travel to a remote site to pick up the print job.

SUMMARY

In one aspect of the disclosure, a method of directing a print job within a network is disclosed. The method comprises receiving, at a print service computer, a request by a user for the print job; receiving a destination, input into an electronic user interface, by the user; identifying a first printer along an intended route to the destination, to print the print job; monitoring by the print service computer, a location of an electronic tracking device on the user along the intended route; and redirecting the print job to a second printer based on the location of the electronic tracking device along the intended route.

In another aspect, a computer program product to automatically direct a print job to printers within a network is disclosed. The computer program product comprises a non-transitory computer readable storage medium having computer readable program code embodied therewith. The computer readable program code is configured, when executed by a processor, to: receive, at a print service computer, a request by a user for the print job; receive a destination, input into an electronic user interface, by the user; identify a first printer along an intended route to the destination, to print the print job; monitor by the print service computer, a location of an electronic tracking device on the user along the intended route; and redirect the print job to a second printer based on the location of the electronic tracking device along the intended route.

In yet another aspect, a print service computer is disclosed. The print service computer comprises a network connection; a memory storage device; and a processor coupled to the network connection and connected to the memory storage device, wherein computer executable instructions in the memory storage device configure the processor to: receive through the network connection, a request by a user for a print job; receive a destination, input into an electronic user interface, by the user; identify a first printer to print the print job, wherein the first printer is connected through a network to the network connection, and wherein the first printer is located along an intended route to the destination; monitor, through the network connection, a location of an electronic tracking device on the user along the intended route; and redirect the print job to a second printer connected to the network, based on the location of the electronic tracking device along the intended route.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

Figure 1:
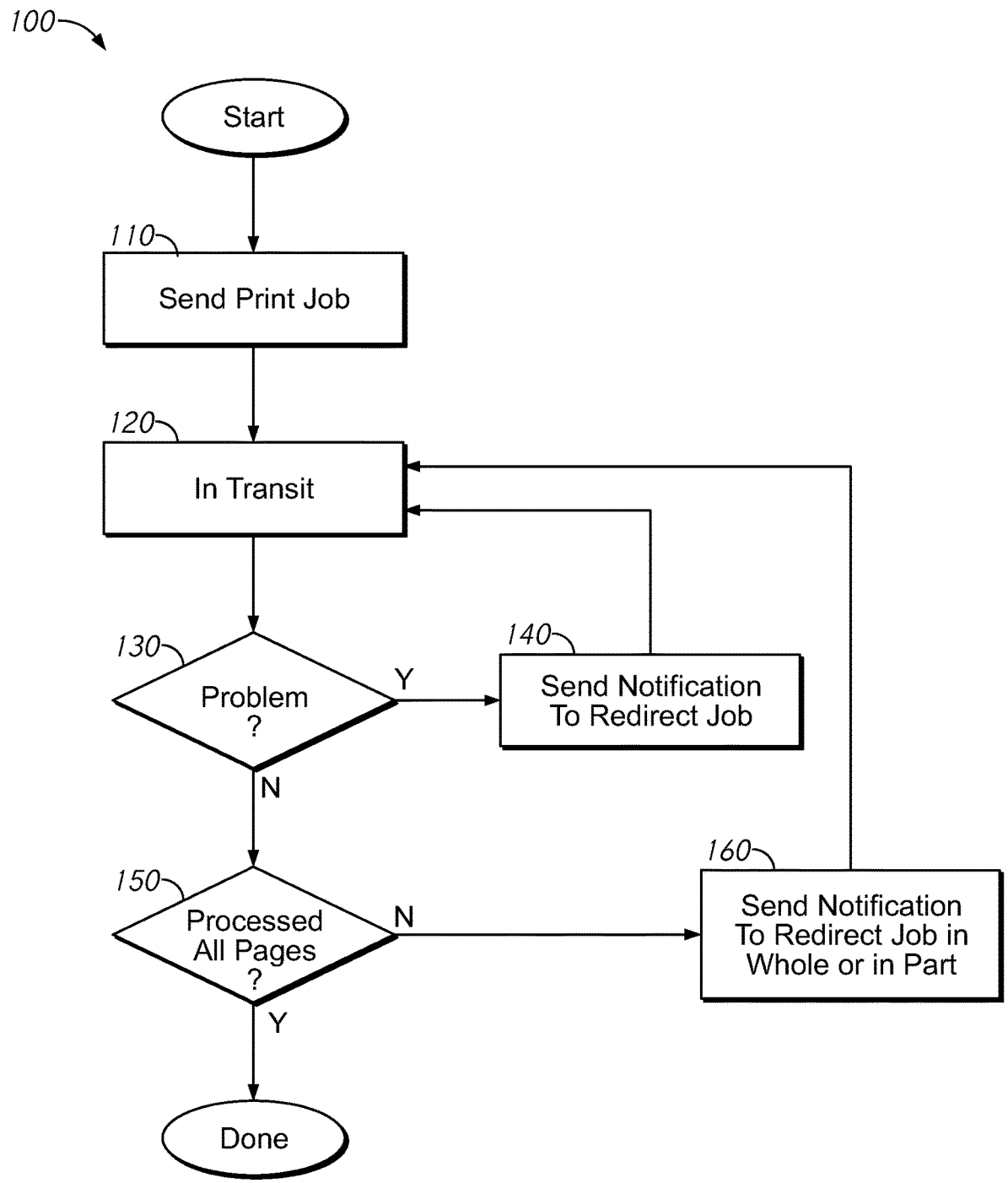
FIG. 1 is a flowchart of a method of automatically redirecting a print job in accordance with an embodiment of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. Like or similar components are labeled with identical element numbers for ease of understanding.

As will be appreciated, embodiments disclosed below may be practiced in and have industrial applicability to the general fields of printing.

Generally, embodiments of the subject technology provide computer implemented methods that automatically redirect a print job from an initial printer destination to another printer based on qualifying criteria while the user in transit.

In many daily scenarios, printers may be shared and are not next to a user. Prior to the disclosure of the embodiments below, a user requesting a print job must arrive at the initially selected printer to receive the print job. If the print job failed for whatever reason, the user usually needs to return to a computer to restart the print job.

In many situations, it is common for the user to need to deviate from the selected printer. If for whatever reason, the user is called away or needed to go elsewhere other than the selected printer, the user is still required to either return to the printer (which is typically out of the way of their new path) to pick up the print job or must return to the computer to make a new print request for the print job to be printed at a different printer.

For example, within an office space environment, if a user selects a printer for a print job, the user typically heads in the direction of the printer. In some cases, a colleague may inform the user on the way to the print job that another co-worker (for example, a supervisor) is calling them in to discuss a matter. The supervisor's office may be in a different direction than the printer and in some cases, on a different floor. If the supervisor wanted to see the document being printed, time is lost by the user travelling to the printer and then to the supervisor's office. If the supervisor's needs were unrelated to the print job, then the user loses time backtracking their way to the printer to recover the print job.

In a similar scenario as described above, should a supervisor want to see a printed copy of the document, a lot of time is lost by the user waiting for the print job to finish at the selected printer. Should the selected printer encounter an error, the print job is stuck in limbo or cancelled out by the print spool and the print job must be restarted, thus wasting more time.

In another example, a user may be outside an office space. The user may be attending a presentation or conference. The user may select a print service business on an intended commute route to the presentation/conference locale to print out the print job. If for example, the commute path becomes inefficient to use because of a traffic incident or congestion, the user has no option to deviate their route because the print job request is already set at the business locale selected.

In general, as used below, a "print job" may refer to a single image, a page with multiple images contained within its borders, or multiple pages with a combination of the aforementioned image(s). As "print jobs" are requested, aspects of the embodiments disclosed may compile multiple "print jobs" into a single overall "print job", "print project", or "print publication" laid out onto a sheet or series of sheets that will be assembled into an overall publication.

Aspects of the embodiments disclosed below may automatically detect when a user is approaching a selected printer and if the print job is not finished, send the remainder of the print job to a second printer on the way to the user's destination. In some embodiments, the user may deviate from an intended route and the system may detect that another printer is more readily available to the user along the deviated route and may redirect the print job to the other printer. The user may pick up portions of the print job at one printer and without having to stop may continue on his or her route picking up other portions of the print job at other printers along the way without having to reissue a print command.

For the following flowchart, steps of the processes may be referred to as blocks. As will be described further below, steps may be performed by a machine, for example, a computing device, an image forming apparatus, and/or a processing unit. While the steps may be described in one order, it will be understood that variations to the order may be practiced or the order in which claims below are written may vary from the following without departing from the scope of the invention.

Referring now to FIG. 1, a method 100 of directing a print job within a network is shown according to an exemplary embodiment. The method 100 may include sending 110 a print job through a network to a user selected printer. In some embodiments, the user may enter an intended end destination. A route of the user to the end destination may be mapped, either automatically by a software application or by manual user entry. The route may include a path of the user to the selected printer en route to the end destination. The network may monitor 120 the location of the user while the user is in transit to a destination. The destination by default may be the selected printer if the user has no other location being travelled to at the time of destination entry. If the user, while in transit, decides to go somewhere while in transit that is not on the path to the entered end destination, the system may detect the deviation and may estimate an arbitrary new destination based on the user's current path. In an exemplary embodiment, the user may be carrying an electronic tracking device which the network may poll. In some embodiments, the electronic tracking device may be a mobile computing device with a software application which communicates with the network. In some embodiments, the electronic tracking device may be for example, a beacon device communicating with a beacon system. A beacon system may be beneficial for short range communication within for example, an office space. In some embodiments, the electronic system may include a global positioning system (GPS) that the network monitors to track the location of the user. While the user is in transit to the print job, the network may periodically check 130 the status of the print job, looking for example, for a problem with the print job being available when the user is scheduled to arrive at the selected printer. A problem may include the user deviating from a route to the selected printer. A problem may also include problems with the printer which may prevent the printer from performing the print job by the time the user arrives at the printer. For example, the printer running out of ink, the printer experiencing a paper jam, the printer running out of paper, or the printer experiencing a software or communications fault may be registered as a problem by the network.

When a problem is registered by the network, the network may send 140 the user a notification to redirect the print job. In some embodiments, the user may be provided a user interface (UI) with the software application on a mobile computing device. In the UI, the user may select a second printer which may be along their current route. The print job may be redirected to the second printer. Should any subsequent problems occur (including for example, the user deviating from his current or new route), the process of notification 140 and selecting a new printer may repeat. In some embodiments, the network may automatically determine a closest second printer for redirection of the print job. The closest second printer may be based on the relative location of the user to printer in the network. In some embodiments, the closest second printer may be based on the availability of a printer to print out a job by the time the user arrives at the printer. For example, if between two potential printers, one printer has a current print schedule that is estimated to occupy printing so that the redirected print job will not be ready (at least partially) by the time the user would arrive, then the system may look to the other printer and its print schedule. If the other printer can print out the redirected print job by the time the user would arrive, then the system may select the other printer. The notification by the network may include the location of the second printer for the redirected print job. The user may see the second printer location and, in some embodiments, may map a new route to the second printer.

While the user is in transit, and no problems occur, the network may determine 150 whether all the pages of the print job have been processed and may be printed by the time the user will arrive at the selected initial printer (or next printer depending on whether any previous redirected print jobs have occurred). In response to the print job not being complete by the time the user arrives at the printer, the network may send 160 a notification to the system to redirect the entire print job if necessary or the remaining unprinted portion of the print job (for example, starting at a first incomplete page) to another printer. In an exemplary embodiment, the remaining print job (in whole or in part) may be sent to a printer further along the user's route to an end destination. The method 100 may end when the user has picked up all pages of the print job from one or more printers in the network.

Figure 2:
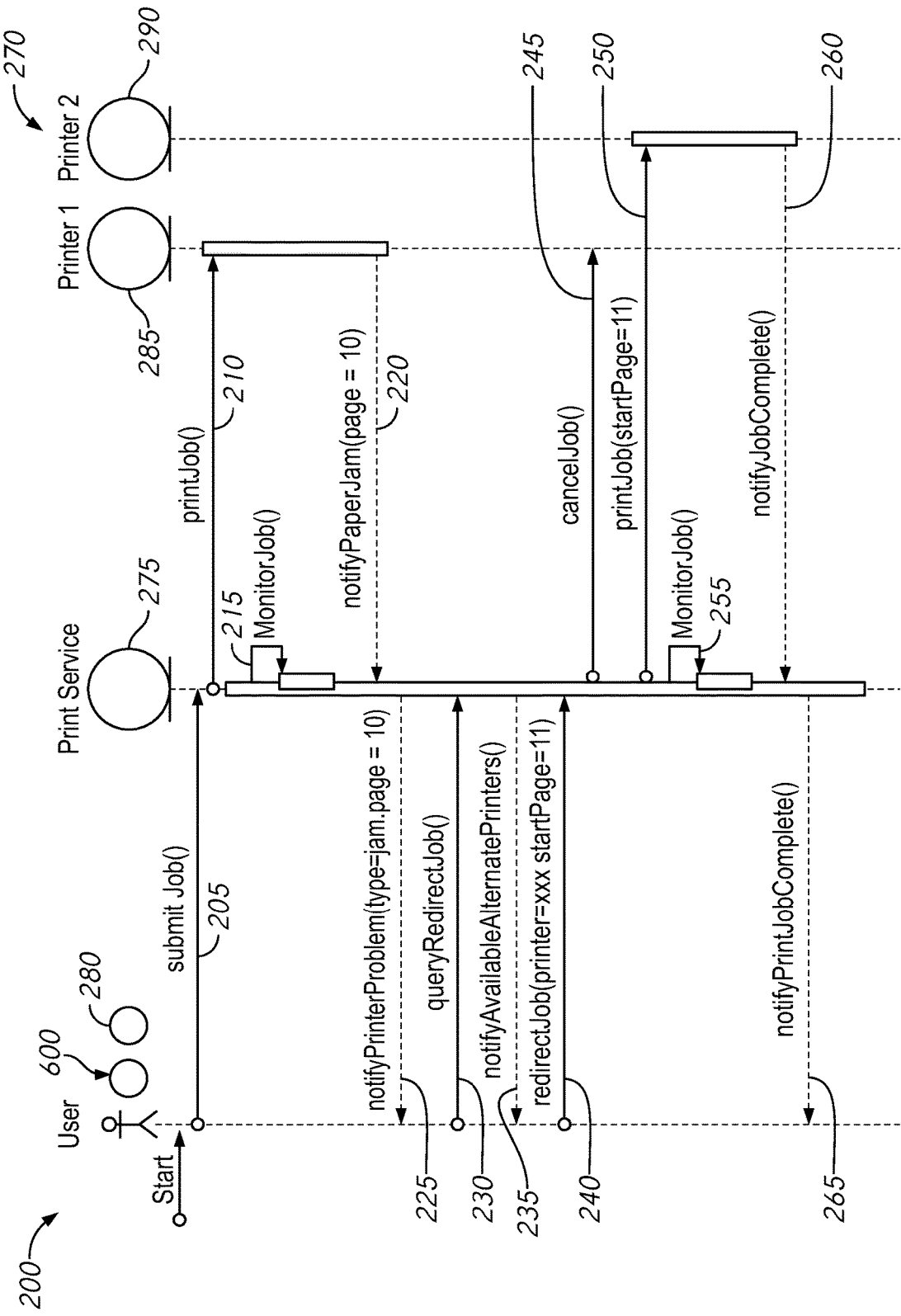
FIG. 2 is a flowchart showing a sequence of actions in a system that automatically redirects a print job in accordance with embodiments of the subject technology.
Figure 2A:
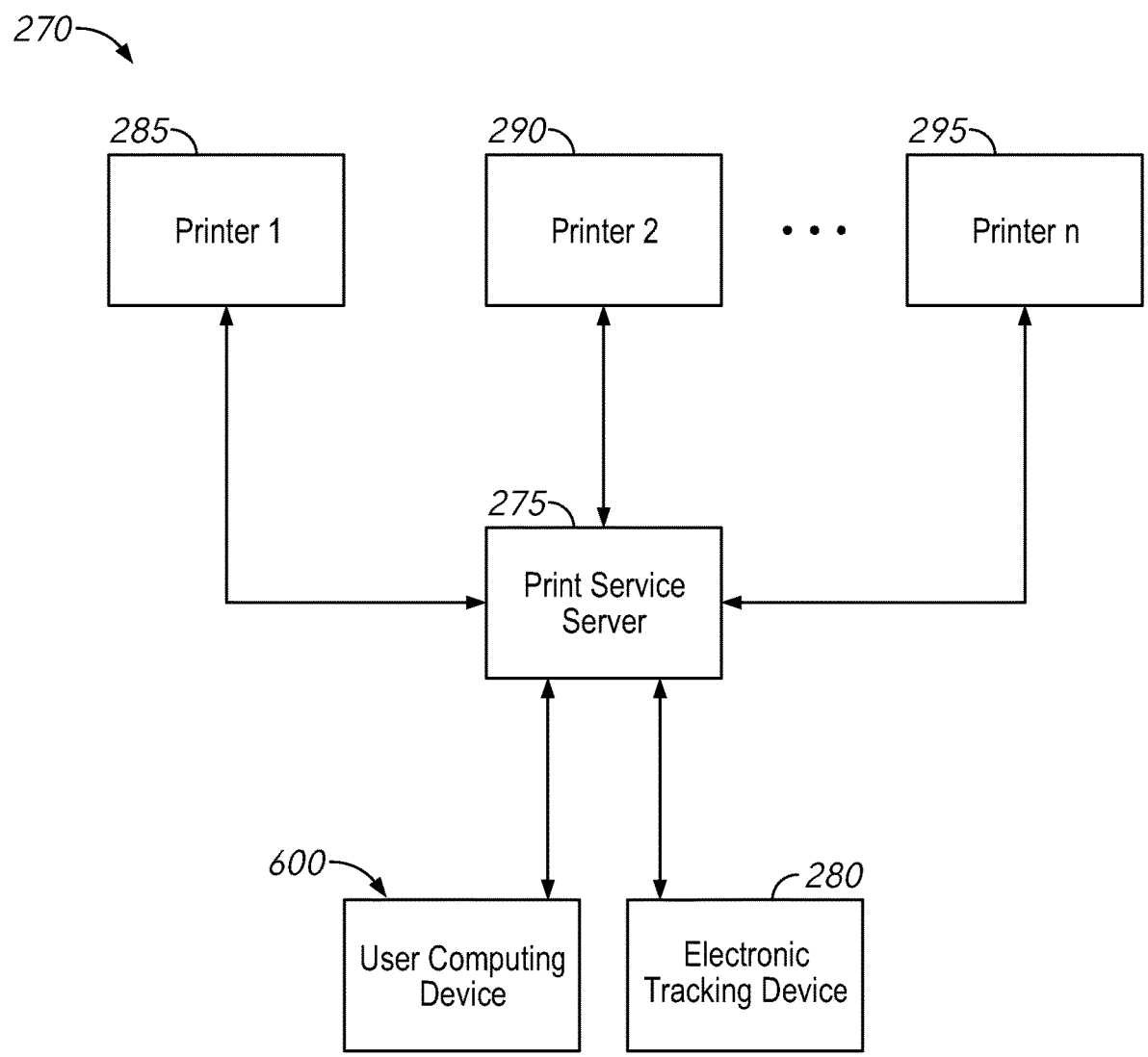
FIG. 2A is a block diagram of a system in accordance with embodiments of the subject technology.

Referring now to FIGS. 2 and 2A, a process 200 of actions in a system 270 that automatically redirects a print job is shown according to an exemplary embodiment. The system 270 may in some embodiments be a network of connected devices. The system 270 may include a print service server 275 which coordinates print job requests from users connected to the network through, for example a user computing device 600. Details of the computing device 600 are described below in FIG. 6. For purposes of illustration, the computing device 600 may in some of the following examples be a workstation computer (for example, desktop, tablet, or all-in-one) or a mobile computing device which has wireless or telephony capabilities (for example, a smart phone or Wi-Fi enabled device). The network may include a plurality of printers 285, 290 and so on represented by printer "n" 295.

A user may submit 205 a print job to the print service server 275. In some embodiments, the user may enter an intended route in a map displayed in a user interface. While a user is in transit from a starting point to a destination point (having entered the destination point in the user interface field), the print service server 275 may send 210 a network print job to a printer 285 along the route. The printer 285 may be a first printer on the route or may be a printer selected based on an expected time of completion for the print job and an expected arrival time of the user to the printer 285. The print service server 275 may monitor 215 the progress of the print job at the printer 285. The print service server 275 in some embodiments may concurrently monitor the queue and workload of additional printers along the route, so that the print job may be redirected, in whole or in part, to another printer if necessary.

In some embodiments, the user may carry an electronic tracking device 280 which is in wireless communication with the print service server 275 and periodically provides the current location of the user to the print service server 275. In some embodiments, the mobile computing device 600 may simultaneously serve as the electronic tracking device 280. In some embodiments, the electronic tracking device 280 may be part of a beacon system which tracks the user when the electronic tracking device 280 is within proximity of a beacon-registering device (not shown) along the route (whether within an office space or outside an office space but in business locales). If the user alters their intended route, the system 270 may either automatically detect deviation from the intended route or the user may manually issue a command to the system 270 indicating his or her change in route. In some embodiments, the user may enter in a deviated route through the UI. The system 270 may notify the user by the UI displayed on the mobile computing device 600 of suggested printers along the deviated route to which the print job should be redirected.

If the print job has problems in printing, the printer 285 may send 220 a message (for example, "paper jam") to the print service server 275. The system 270 may send 225 a notification to the user (for example, via the mobile computing device 600). The system 270 may query 230 the user as to whether the print service server 275 should redirect the print job. The notification may include sending 235 a notification with suggested alternate printers to redirect the print job to. In response to confirmation from the user to redirect 240 the print job, the print service server 275 may cancel 245 the print job from the printer 285 queue and may redirect 250 the print job to printer 290. The print service server 275 may monitor 255 the progress of the print job until printer 290 notifies 260 the print service server 275 that the print job is complete. The print service server 275 may send 265 a notification to the user that the print job is complete.

If a print job is only partly finished when the user reaches the printer 285, either the system 270 or the user may send a notification to initiate redirecting the remaining part of the job, or the whole job, to a printer 290 which may be further along in the route. The system 270 may also optionally send the user location notifications as the user approaches the printer 290, in case the user doesn't know the printer 290's exact location. In each case, the list of alternate printers 290 to 295 (FIG. 2A) suggested to the user may be filtered to conform to any restrictions the user has placed on the print job regarding required toners, required paper stock, or resource levels adequate to print the current job, and may also be filtered to conform to any restrictions the user has placed on the maximum allowed detour from the route, in either time or distance. Any restrictions not met by the printer 285 may trigger redirection of the print job in whole or in part to the printer 290 or any other printer 295 farther along the route.

In an open environment (for example, outside of an office space), the system 270 may use GPS. The print service server 275 may be configured to contain the GPS locations of printers 285, 290, 295, which may be provided to for example, participating print shops that will print out the print job for a user travelling between two locations. For example, a user may be travelling from an office or hotel room to a conference, a client meeting, or a sales presentation. The print service server 275 may track the GPS location of the user. The print service server 275 may communicate with the user's mobile device 600, using for example, a dedicated mobile print software application, in order to track the user's location and planned route.

In a closed environment such as an office building, the system 270 may rely on beacons using short range radio beacons (for example, BlueTooth® based beacons using the iBeacon® or EddyStone® protocols). The print service server 275 may be configured to contain the exact location of the available printers 280, 290, 295, which can be obtained either by having the printers 280, 290, 295 communicate with the beacons and report their location to the print service server 275, or by having a technician visit the printers 280, 290, 295 with a mobile device running a dedicated application that communicates with the beacons and marks their location in a map file. The print service server 275 may track the user's location by having the user install a dedicated application on his/her mobile computing device 600, which will communicate with the print service server 275 to track the user's exact location in the building, and planned route.

Figure 3:
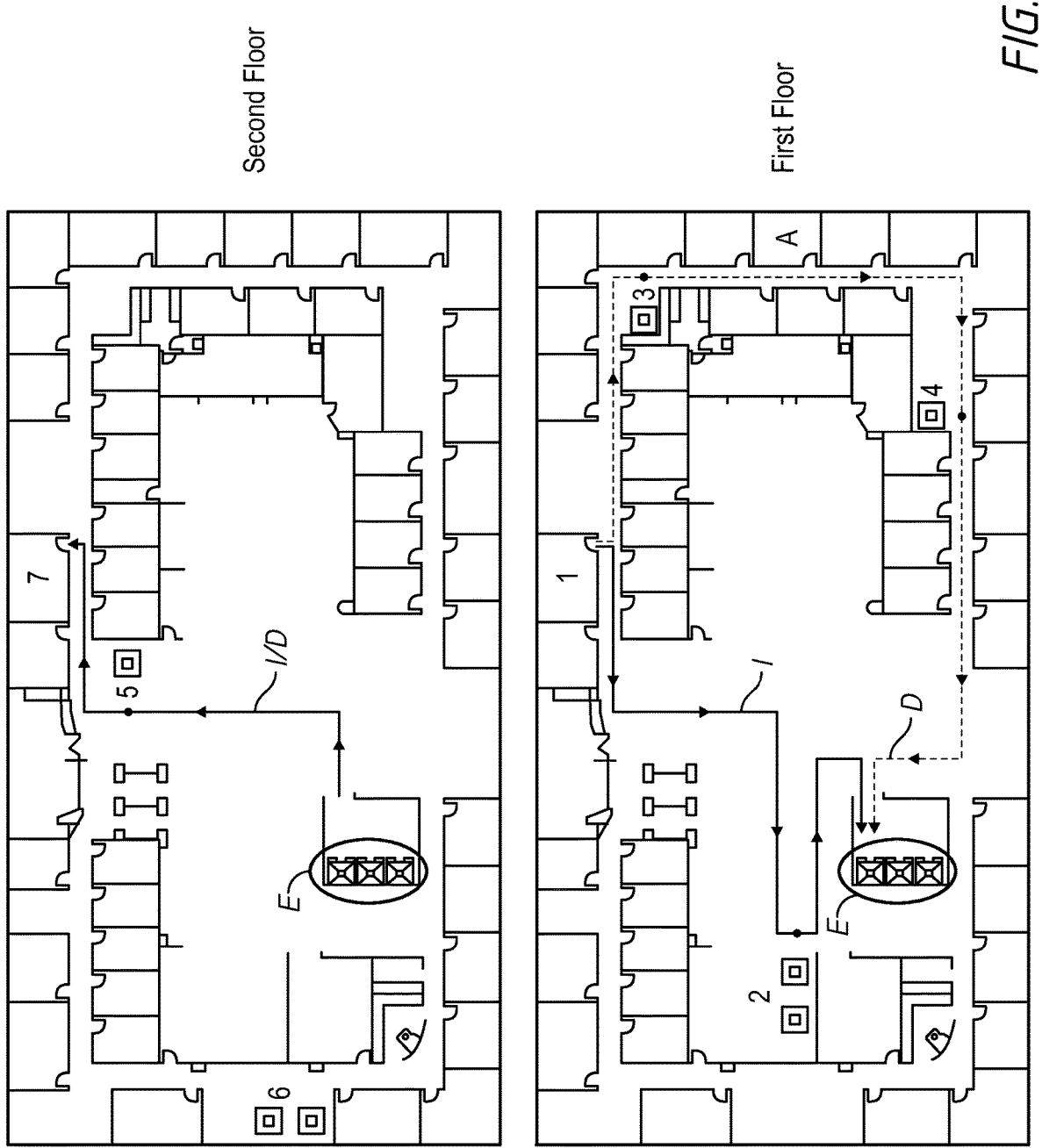
FIG. 3 is a schematic view of a floorplan illustrating a redirected print job in accordance with embodiments of the subject technology.

Referring now to FIG. 3, a floorplan is shown to illustrate aspects of the subject technology. The floorplan represents an indoor office space. The office has two floors. A user plans on printing out a document and to visit a co-worker. The user's itinerary begins from the office labelled "1" on the first floor and plans on ending up at the office labelled "7" on the second floor. The intended route of the user is labeled "I". The route includes using elevators labeled "E" to travel between the first and second floors. Initially, the system may plan to start the print job at one of the printers at 2 on the first floor and may finish the print job at printer 5 on the second floor (after the user takes the elevator). The system may pre-plan the printers based on previous habits of the user who, in the past has taken the intended route I to get to office 7. But if the user, contrary to his habit or intended route, turns left on leaving office 1, intending for example to stop by office A on the way along a route which deviates from the intended route (labeled "D"), the system may detect the deviation from the intended route I and may reroute the print job through printers 3 and 4 (which may print out portions of the print job respectively based on the location of the user to each printer and the expected completion progress of the print job), again finishing the print job on printer 5 if necessary. The route labeled "I/D" on the second floor represents the rejoinder of the deviated route "D" with a final leg of the intended route "I".

The following descriptions are additional example scenarios to help illustrate uses of the embodiments disclosed. it will be understood however that other uses and scenarios are contemplated without limitation to the following descriptions.

Example 1

A job is sent to a networked printer, and as user is walking to it to pick it up and go to a meeting, the user receives a notification that the printer has gone out of service. The notification may list alternate available printers on the way (route) to his/her destination in the building, and the user can reply with a command to redirect the job to another printer in the list en route to the destination.

Example 2

A 20-page job is sent to a networked printer, and as the user is walking to it to pick it up and go to a meeting, the user receives a notification that the printer has jammed after printing 10 of the pages in the job. A list of alternate available printers on the way to his/her destination in the building may be displayed on a user's mobile computing device. The user can reply with a command to redirect the remaining 10 pages to another printer, and cancel the remainder of the job on the jammed printer. The user may pick up the first printed 10 pages at the first printer and may continue on to the next printer to pick up remaining pages of the print job.

Example 3

A print job is sent to a networked printer in a facility remote from the user's starting point. As the user is driving to it to pick up the print job on the way to some further destination, the user decides to take a detour (for example, to pick up another item or because of traffic congestion). The user can send the system a request to redirect the job to an available printer along the new route, and the user will receive a list of alternate printers to redirect the job to.

As will be appreciated, the above scenarios are only for purposes of illustration and are not restrictive of how aspects of the embodiments may be used. For example, while some scenarios describe a next printer being available along a route, it will be appreciated that some embodiments may recognize a printer error and may allow the user to finish the print job at another printer regardless of route, but in practice saves the user from having to restart the print job.

Figure 4:
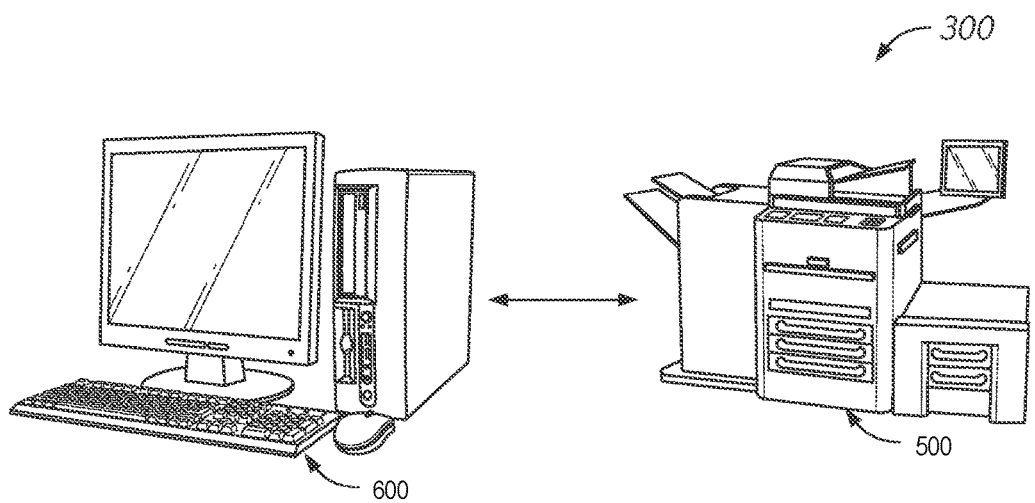
FIG. 4 is a schematic of a print job system in accordance with an embodiment of the subject technology.
Figure 5:
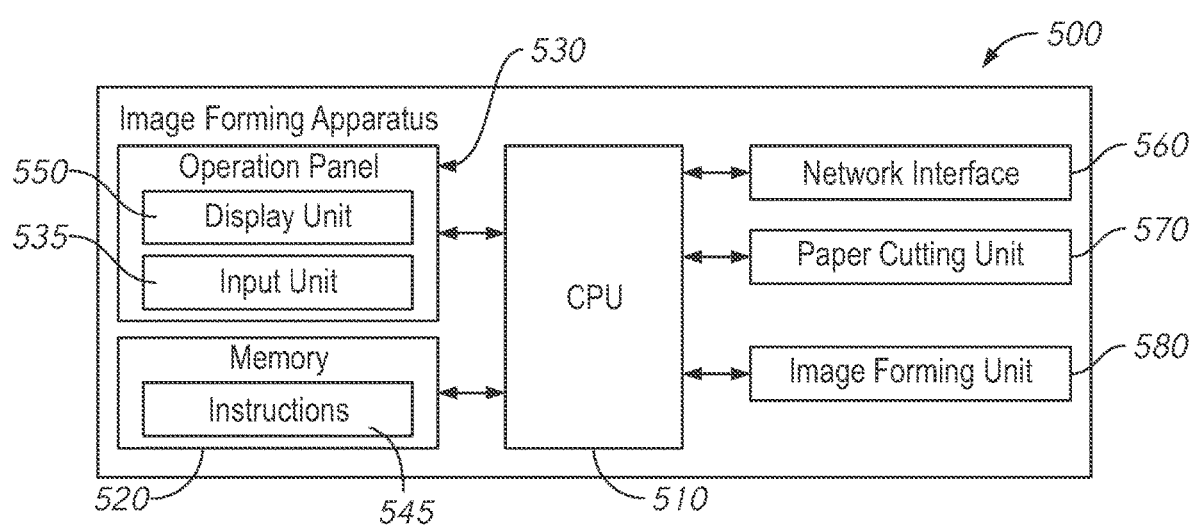
FIG. 5 is a block diagram of an image forming apparatus in accordance with an embodiment of the subject technology.
Figure 6:
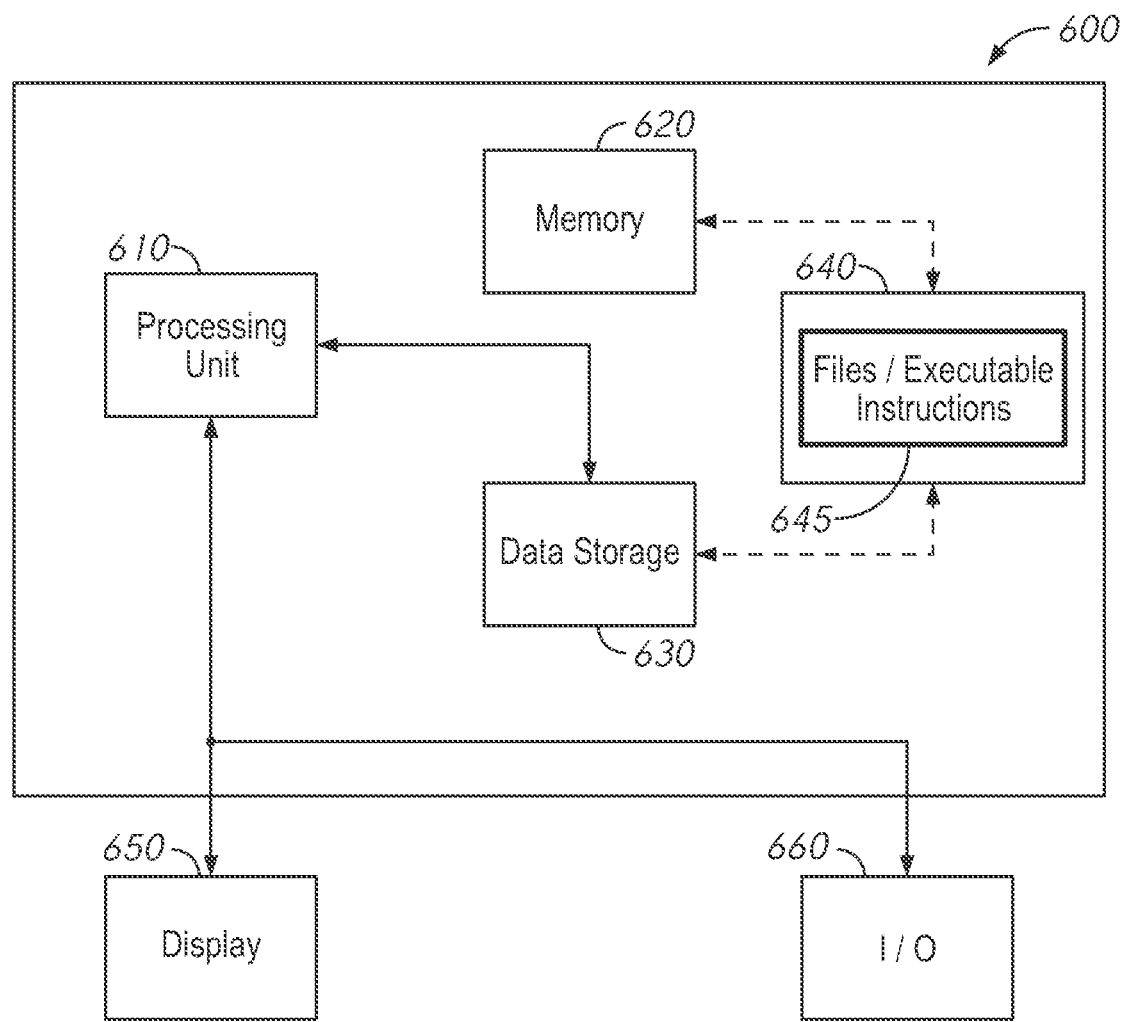
FIG. 6 is a block diagram of a computing device in accordance with an aspect of the subject technology.

Referring now to FIGS. 4-6, system and machines of the subject technology are shown according to exemplary embodiments. A system 300 is shown in FIG. 4 which may include an image forming apparatus 500 connected to a computing device 600. In some embodiments, the above described process(es) may be loaded as executable instructions into one or both of the image forming apparatus 500 and the computing device 600. FIG. 5 shows a schematic example of the image forming apparatus 500. FIG. 6 shows a schematic example of a computing device 600. In general, the process(es) above may be implemented by either or both the image forming apparatus 500 and the computing device 600. In addition, it will be understood that multiple instances of the computing device 600 may be connected to the same image forming apparatus 500, however, for sake of illustration, a single computing device 600 is shown. Likewise, as described above multiple instances of the image forming apparatus 500 may be connected to the same computing device 600; for example, as multiple printers 280, 290, and 295 connected to a print service server 275 as described in FIGS. 2 and 2A. In some embodiments, the image forming apparatus 500 and/or the computing device 600 may include software embodiments, which may provide the user interface from which a user may receive notifications, maps, lists of alternate printers, and enter in selections of printers and routes according to the embodiments described above.

The image forming apparatus 500 may be for example, a computing based image processing and printing device that can receive print job requests (for example, a printer, a fax machine, a copier machine, a multi-function printer). For example, the printers 285, 290, and 295 are examples of an image forming apparatus 500. The components of the image forming apparatus 500, may include, but are not limited to, one or more processors or processing units 510, a system memory 520, an operation panel 530, an input unit 535, a set of program modules 545 including files and executable instructions, a display unit 550, a network interface 560, a paper cutting unit 570, an image forming unit 580, and a bus system that couples various system components including the system memory 520 to the processor(s) 510. The memory storage 520 may store for example, executable instructions and/or electronic versions of the image objects to be printed. In some embodiments, the processors 510 may include a processing unit dedicated to graphics and image processing (for example a graphics processing unit (GPU) or visual processing unit (VPU). As a GPU or VPU, the processor 510 may implement executable instructions focused on image processing applications either alone or in coordination with other general processor 510 types such a CPUs, microchips, and the like.

The computing device 600 may be for example, a computer system or a computer server. In some embodiments, the image forming apparatus 500 may be another example of a computing device 600. As will be appreciated, some aspects of the embodiments disclosed above may turn the computing device 600 into a special purpose computer system. For example, in the role of a host server, the computing device 600 may implement for example the functions of related to the print service server 275 (FIGS. 2 and 2A) described above. More particular to this disclosure, as a host server, the computing device 600 may receive print job requests, monitor print job progress, monitor location of a user, redirect print jobs based on user location and/or based on printer faults or failure to print, provide lists of alternate printers, and communicate with printers in a network and with a user-based mobile computing device according to the process(es) described above. In the role of a user device, the computing device 600 is generally not a server but may instead be desktop computers, tablet or laptop computers, all-in-one computer stations, a mobile computing device (for example, a smart phone, smart wearable devices (glasses, jewelry, watches, ear wear, etc.), or programmable electronics.

The components of the computing device 600, may include, but are not limited to, one or more processors or processing units 610, a system memory 620, data storage 630, a computer program product 640 having a set of program modules 645 including files and executable instructions, and a bus system that couples various system components including the system memory 620 to the processor(s) 610. The memory storage 620 may store for example, electronic files of the image objects to be printed, historical routes of a user, entered routes by a user, alternate route generating files for a route, and maps including printers along various routes within the maps. In some embodiments, the processors 610 may include a processing unit dedicated to graphics and image processing (for example a graphics processing unit (GPU) or visual processing unit (VPU). As a GPU or VPU, the processor 610 may implement executable instructions focused on image processing applications either alone or in coordination with other general processor 610 types such a CPUs, microchips, and the like.

The computing device 600 may be described in the general context of computer system executable instructions, such as the program modules 645 which represent a software embodiment of the system and processes described generally above with respect to FIGS. 1 and 2. The program modules 645 generally carry out the functions and/or methodologies of embodiments as described above. The computing device 600 may typically include a variety of computer system readable media. Such media could be chosen from any available media that is accessible by the computing device 600, including non-transitory, volatile and non-volatile media, removable and non-removable media for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing. The system memory 620 could include one or more computer system readable media in the form of volatile memory, such as a random-access memory (RAM) and/or a cache memory. By way of example only, the data storage system 630 may read from and write to a non-removable, non-volatile magnetic media device. The system memory 620 may include at least one program product 640 having a set (e.g., at least one) of program modules 645 that are configured to carry out the functions of embodiments of the invention in the form of computer executable instructions. The program product/utility 640, having a set (at least one) of program modules 645, may be stored in the system memory 620 by way of example, and not limitation, as an operating system, one or more application programs, other program modules, and program data. Some embodiments may generate an electronic user interface (viewable and controllable from the display unit 550 or display 650) that may allow the user to enter destinations, routes, and selections of printers (whether it be a first printer or an alternate printer triggered by deviation from a route or printer fault in the processing of a print job).

The computing device 600 may communicate with one or more external devices including for example, an electronic display 650 which may in some embodiments be configured for tactile response as in a touch screen display. User input into the display 650 may be registered at the processor 610 and processed accordingly. Other devices may enable the computing device 600 to communicate with one or more other computing devices, either by hardwire or wirelessly. Such communication can occur via Input/Output (I/O) interfaces/ports 660. In some embodiments, the I/O interfaces/ports 660 may be specially configured to handle aspects of the embodiments described herein converting the computing device 600 into a special purpose machine. For example, as a printer, the I/O interfaces/ports 660 may be configured to transmit messages of print job status and redirection of a print job to a print service server. The I/O interfaces/ports 660 may also include printing modules (for example, ink jet print heads, laser print systems, etc.) for rendering print jobs.

The computing device 600, through the I/O interface/ports 660, may communicate with one or more networks such as a local area network (LAN), a general wide area network (WAN), and/or a public network (e.g., the Internet) via a network adapter as is commonly known in the art. Each of the operating system, one or more application programs, other program modules, and program data or some combination thereof, may include an implementation of a networking environment. In some embodiments, the computing device 600 may be a cloud computing node connected to a cloud computing network (not shown). The computing device 600 may be practiced in distributed cloud computing environments where tasks are performed by remote processing devices that are linked through a communications network. In a distributed cloud computing environment, program modules may be located in both local and remote computer system storage media including memory storage devices. The computing device 600 may hold electronic files and copies of print jobs in more than one physical location, each of which may be referenced and/or may trigger redirection of a print job based on qualifying criteria described for example, above.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "module", "circuit", or "system." Furthermore, aspects of the disclosed invention may take the form of a computer program product embodied in one or more computer readable media having computer readable program code embodied thereon. In some embodiments, the output of the computer program product provides an electronic user interface on the display 650 which may be controlled via direct contact with the display 650 or via the I/O interfaces 660 (which may be for example, interface devices such as keyboards, touchpads, a mouse, a stylus, or the like).

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 610 of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks in the figures.

Those of skill in the art would appreciate that various components and blocks may be arranged differently (e.g., arranged in a different order, or partitioned in a different way) all without departing from the scope of the subject technology. The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

Thus, the claims are not intended to be limited to the aspects shown herein, but are to be accorded the full scope consistent with the language of claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method of directing a print job within a network, comprising:
   receiving, at a print service computer, a request by a user for the print job;
   receiving a destination by the user;
   identifying a first printer and a second printer along an intended route to the destination, to print the print job, wherein the print job includes a first portion and a second portion and the first portion of the print job is sent to the first printer and the second portion of the print job is sent to the second printer;
   monitoring by the print service computer, a location of an electronic tracking device on the user along the intended route;
   determining the user deviated from the intended route to the destination;
   determining a deviated route to the destination;
   identifying one or more alternate printers along the deviated route;
   sending the user a list of the identified alternate printers to select one or more printers for redirection of the print job;
   receiving a first command from the user to select a third printer and a fourth printer to process a remainder of the print job wherein the remainder of the print job is an incomplete portion of the print job;
   determining the remainder of the print job, including determining pages of the print job already completed on at least one of the first printer and the second printer;
   redirecting the remainder of the print job to the third printer and to the fourth printer; and
   receiving a second command from the user to cancel the remainder of the print job to be processed on at least one of the first printer and the second printer.

2. The method of claim 1, wherein
   the third printer and the fourth printer are identified from the list of alternate printers based on the location of the electronic tracking device along the deviated route.

3. The method of claim 1, wherein the electronic tracking device is a mobile computing device.

4. The method of claim 3, further comprising tracking the location of the electronic tracking device by a global positioning system (GPS) relaying the location of the user to the printer service computer.

5. The method of claim 1, further comprising tracking the location of the electronic tracking device by a system of beacons relaying the location of the user to the printer service computer.

6. The method of claim 1, further comprising determining a status of the print job, wherein the step of redirecting the remainder of the print job to the fourth printer is based on the status of the print job.

7. The method of claim 6, wherein the status of the print job includes a printer error preventing a completion of the print job at the second printer.

8. The method of claim 6, wherein:
the step of determining the status of the print job includes determining a progress of the print job at the third printer;
determining whether a print page in the progress of the print job is incomplete; and
redirecting a second remainder of the print job, starting at the incomplete print page, to the fourth printer.

9. The method of claim 1, further comprising:
receiving a message request from the user to redirect the print job; and
sending the user the list of the identified alternate printers to select for redirection of the print job.

10. A computer program product to automatically direct a print job to printers within a network, the computer program product comprising a non-transitory computer readable storage medium having computer readable program code embodied therewith, the computer readable program code being configured, when executed by a processor, to:
receive, at a print service computer, a request by a user for the print job;
receive a destination by the user;
identify a first printer and a second printer along an intended route to the destination, to print the print job, wherein the print job includes a first portion and a second portion and the first portion of the print job is sent to the first printer and the second portion of the print job is sent to the second printer;
monitor by the print service computer, a location of an electronic tracking device on the user along the intended route;
determine the user deviated from the intended route to the destination;
determine a deviated route to the destination;
identify one or more alternate printers along the deviated route;
send the user a list of the identified alternate printers to select one or more printers for redirection of the print job;
receive a first command from the user to select a third printer and a fourth printer to process a remainder of the print job wherein the remainder of the print job is an incomplete portion of the print job;
determine the remainder of the print job, including determining pages of the print job already completed on at least one of the first printer and the second printer;
redirect the remainder of the print job to the third printer and to the fourth printer; and
receive a second command from the user to cancel the remainder of the print job to be processed on at least one of the first printer and the second printer.

11. The computer program product of claim 10, wherein the third printer and the fourth printer are identified from the list of alternate printers based on the location of the electronic tracking device along the deviated route.

12. The computer program product of claim 10, wherein the electronic tracking device is a mobile computing device.

13. The computer program product of claim 12, further comprising computer readable program code configured to track the location of the electronic tracking device by a global positioning system (GPS) relaying the location of the user to the printer service computer.

14. The computer program product of claim 10, further comprising computer readable program code configured to track the location of the electronic tracking device by a system of beacons relaying the location of the user to the printer service computer.

15. The computer program product of claim 10, further comprising computer readable program code configured to determine a status of the print job, wherein the step of redirecting the remainder of the print job to the fourth printer is based on the status of the print job.

16. The computer program product of claim 10, further comprising computer readable program code configured to:
receive a message request from the user to redirect the print job; and
send the user the list of the identified alternate printers to select for redirection of the print job.

17. A print service computer, comprising:
a network connection;
a memory storage device; and
a processor coupled to the network connection and connected to the memory storage device, wherein computer executable instructions in the memory storage device configure the processor to:
receive through the network connection, a request by a user for a print job;
receive through the network connection, a destination by the user;
identify a first printer and a second printer to print the print job, wherein the first printer is connected through a network to the network connection, and wherein the first printer and the second printer is located along an intended route to the destination, wherein the print job includes a first portion and a second portion and the first portion of the print job is sent to the first printer and the second portion of the print job is sent to the second printer;
monitor, through the network connection, a location of an electronic tracking device on the user along the intended route;
determine the user deviated from the intended route to the destination;
determine a deviated route to the destination;
identify one or more alternate printers along the deviated route;
send the user a list of the identified alternate printers to select one or more printers for redirection of the print job;
receive a first command from the user to select a third printer and a fourth printer to process a remainder of the print job wherein the remainder of the print job is an incomplete portion of the print job;
determine the remainder of the print job, including determining pages of the print job already completed on at least one of the first printer and the second printer;
redirect the remainder of the print job to the third printer and to the fourth printer; and
receive a second command from the user to cancel the remainder of the print job to be processed on at least one of the first printer and the second printer.

18. The print service computer of claim 17, wherein the third printer and the fourth printer are identified from the list of alternate printers based on the location of the electronic tracking device along the deviated route.

19. The print service computer of claim 17, wherein the computer executable instructions in the memory storage device further configure the processor to:

receive a message request from the user to redirect the print job;
and
send the user the list of the identified alternate printers to select for redirection of the print job.

\* \* \* \* \*